Aug. 24, 1954   K. J. FLEMING   2,687,079
SWITCH ACTUATING MEANS FOR AUTOMATIC ELECTRIC TOASTERS
Filed Aug. 7, 1951
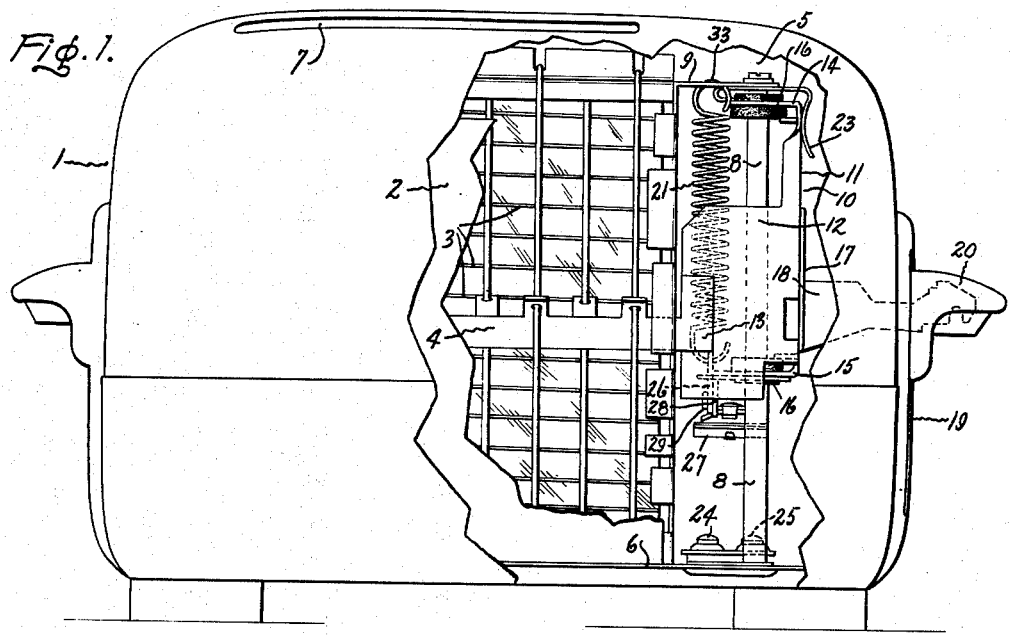
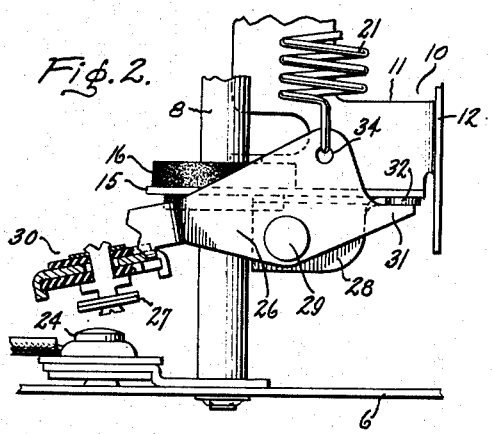
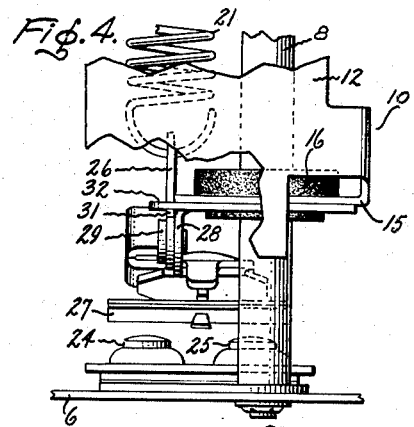
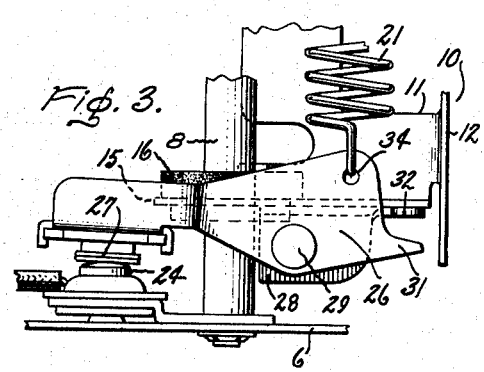
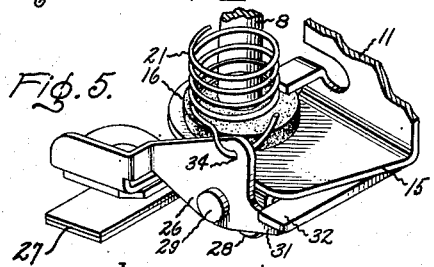
Inventor
Karl J. Fleming
by *Sheridan & Ross*
His Attorney.

Patented Aug. 24, 1954

2,687,079

UNITED STATES PATENT OFFICE 2,687,079

SWITCH ACTUATING MEANS FOR AUTOMATIC ELECTRIC TOASTERS

Karl J. Fleming, Allentown, Pa., assignor to General Electric Company, a corporation of New York Application August 7, 1951, Serial No. 240,704

3 Claims. (Cl. 99—337)

1

The present invention relates to electric bread toasters of the automatic or so-termed "pop-up" type wherein there is provided mechanism for lowering bread supporting means for the slice or slices of bread to be toasted from non-toasting to toasting position against the action of a biasing spring, holding it in toasting position until the bread is toasted and then releasing it for return to non-toasting position.

The object of my invention is to provide an improved construction and arrangement for closing the switch for the toaster heating elements when the bread supporting means is lowered from non-toasting to toasting position which is simple in structure, reliable in operation and capable of being manufactured at low cost.

According to my invention, the movable member of the switch comprises a pivoted lever arm which is carried by and moves with the mechanism for lowering the bread supporting means and has the biasing spring connected to it, it being moved into engagement with the stationary member of the switch during the final downward movement of such mechanism and held in firm engagement therewith by the biasing spring.

In the drawing, Fig. 1 is a side view of a toaster embodying my invention, a part of the casing being broken away and a part being in section to show operating parts; Fig. 2 is a detail view showing the improved switch construction, the switch being open; Fig. 3 is a view similar to Fig. 2 with the switch closed; Fig. 4 is an end view of the structure shown in Fig. 2, and Fig. 5 is a detail perspective view of certain parts.

Referring to the drawing, 1 indicates the toaster housing having walls 2 which define the toasting chamber and in which are located the heating elements 3 and the bread rack or racks 4 as is well understood. The heating elements divide the heating chamber into toasting compartments, there being a bread rack in each toasting compartment. In the present instance, a toaster for toasting simultaneously two slices of bread is indicated which means that there are two toasting compartments with a bread rack in each. At the front end of the casing between end walls of the toasting chamber and casing is a compartment 5 in which operating mechanism for the toaster is housed. At the bottom of housing 1 is a rectangular frame 6 which forms a support for the operating mechanism. Housing 1 is provided with a slot 7 in line with each toasting compartment through which bread slices may be inserted into position on the bread racks.

In compartment 5 is a guide post 8 fixed at its lower end to frame 6 and at its upper end to a stationary frame member 9. Mounted to slide on post 8 is a carriage 10. Carriage 10 comprises an end wall 11 having at each side a rearwardly extending wing 12 to which the bread racks 4 are connected as indicated at 13. At its top and bottom edges end wall 11 is provided with rearwardly extending top and bottom walls 14 and 15 having openings through which guide post 8 extends, bushings 16 being positioned in the openings which slide along in engagement with the post. Pivoted at its upper end on end wall 11 is a plate 17 which is biased to a position against end wall 11 by a flat spring member (not shown) and is provided with an arm 18 which projects out through a slot 19 in housing 1 and is provided with an operating knob 20. At 21 is a biasing spring which biases carriage 10 to its upper non-toasting position. By pressing down on knob 20 carriage 10 may be lowered to its toasting position against the action of biasing spring 21. At the upper end of post 8 is a spring tongue 23 behind which the upper end of carriage 10 takes and which acts as a buffer and holding means for the carriage.

The construction so far described is a known one and is to be taken as typical of any "pop-up" type toaster mechanism wherein a carriage is lowered from non-toasting position to toasting position against the action of a biasing spring and at the end of the toasting period is released and is permitted to be returned to non-toasting position by the biasing spring.

My invention has to do only with an improved construction and arrangement for closing the switch on the toaster heater elements and only so much of the toaster mechanism is shown as is required for an understanding of the invention. It will be understood that the toaster comprises suitable means for holding the carriage in toasting position and releasing it at the end of the toasting period. Mechanism such as that shown in the patent to Newell 2,367,044, patented January 9, 1945 and assigned to the same assignee as the instant application may be utilized, for example, or other suitable mechanism.

According to the embodiment of the invention illustrated in the drawing, I provide on frame 6 two spaced stationary contacts 24 and 25 which when bridged close a circuit through the heating elements 3; and on carriage 10, I provide a lever 26 which at one end is provided with a contact bridging bar 27 adapted to bridge contacts 24, 25. Lever 26 is pivoted on an ear 28 which depends from bottom wall 15 of carriage 10, as indicated at 29. Bridging bar 27 is suitably insulated from the end of lever 26 as shown particularly at 30 in Fig. 2. The other end of lever 26 is provided with a part or nose 31 adapted to engage a stop 32 on bottom wall 15. Biasing spring 21 is fixed at its upper end to frame member 9 as indicated at 33 and at its lower end to lever 26 as indicated at 34, the connection at 34 being located on the same side of pivot 29 as is nose 31 so that spring 21 tends to hold nose 31 against stop 32 as shown in Fig. 2. Lever 26 is arranged so that bridging bar 27 engages contacts 24 and 25 just prior to the time the carriage reaches its lowermost position when moved from non-toasting to toasting position, it being understood that when the carriage reaches toasting position, it is held in such position by a suitable catch as referred to above in connection with this type of toaster.

Fig. 1 shows the carriage in its upper non-toasting position; Fig. 2 shows the carriage as having been moved down toward toasting position to a point where bridging bar 27 is about to engage contacts 24 and 25. As shown clearly in Fig. 2, nose 31 on the end of lever 26 is in engagement with stop 32 and is held in engagement with it by spring 21. As the carriage is moved down further from the position shown in Fig. 2, bridging bar 27 engages contacts 24 and 25, thus arresting further movement of the contact bar. Continued downward movement of the carriage now causes lever 26 to turn on its pivot in a clockwise direction thus separating nose 31 from stop 32 as shown in Fig. 3. This turning movement takes place against the action of biasing spring 21 so that the biasing spring serves to hold the bridging bar in firm engagement with the contacts. As stated, the arrangement is such that this action takes place during the final downward movement of the carriage. With this arrangement, it will be seen that spring 21, in addition to serving as a means for biasing the carriage to non-toasting position, serves also to effect firm engagement of the bridging bar with the contacts. Thus the biasing spring serves also as a part of the toaster switch mechanisms.

By my invention I eliminate the need for a separate switch spring which ordinarily needs to be formed from high temperature spring material and at the same time provide a construction wherein good contact alignment is obtained. In addition, I provide a construction having substantially uniform push down force since only the biasing spring is used, there being no additional switch spring which is encountered at the end of the push down movement and which adds to the final push down load.

What I claim as new and desire to secure by Letters Patent of the United States is:

1. In an automatic electric toaster having heating units, an electric circuit for the heating units, a carriage movable from non-toasting to toasting position, and holding and releasing means for the carriage, carriage biasing and circuit closing mechanism comprising a stop on the carriage, stationary contact means, a lever pivoted at a point between its ends on said carriage having circuit closing means on one side of its pivot point to engage and effect the closing of the circuit through said contact means and the heating units and a part on the other side of its pivot point for engagement with said stop, and a biasing spring fixed at one end and connected to said lever at its other end on the side of the lever pivot at which said part is located whereby said spring serves to bias the carriage to non-toasting position and said part into engagement with said stop, said lever being so positioned on the carriage that said circuit closing means engages said stationary contact means during the latter part of the downward movement of the carriage to move said lever part away from said stop whereby said biasing spring serves to hold said circuit closing means against said contact means.

2. In an automatic electric toaster having a base, heating units on the base, an electric circuit for the heating units, a carriage movable from non-toasting to toasting position, and holding and releasing means for the carriage, carriage biasing and circuit closing mechanism comprising a stop on the carriage, a pair of stationary spaced contacts on the base, a lever pivoted at a point between its ends on said carriage having the bar on one side of its pivot point for bridging said spaced contacts to effect the closing of a circuit through said contacts and the heating units and a part on the other side of its pivot point for engagement with said stop, and a biasing spring fixed at one end and connected to said lever at its other end on the side of the lever pivot at which said part is located whereby said spring serves to bias the carriage to non-toasting position and said part into engagement with said stop, said lever being so positioned on the carriage that said bar engages said stationary contacts during the latter part of the downward movement of the carriage to bridge said spaced contacts and move said lever part away from said stop whereby said biasing spring serves to hold the bar against said spaced contacts.

3. In an automatic electric toaster having a frame, heating units carried by the frame, an electric circuit for the heating units, a carriage movable on the frame from non-toasting to toasting position, and holding and releasing means for the carriage, carriage biasing and circuit closing mechanism comprising a stop on the carriage, a lever pivoted on said carriage having circuit closing means and a part for engagement with said stop, a biasing spring fixed at one end and connected to said lever at its other end, said spring serving to bias the carriage to non-toasting position and said part into engagement with said stop, and contact means on the frame connected in circuit with said heating units positioned in the path of movement of said circuit closing means, said lever being so positioned on the carriage that said circuit closing means engages said contact means during the latter part of the downward movement of the carriage to close the circuit through said heating units and move said lever part away from said stop whereby said biasing spring serves to hold said circuit closing means against said contact means.

References Cited in the file of this patent

UNITED STATES PATENTS

| Number | Name | Date |
| --- | --- | --- |
| 1,963,409 | Johnson | June 19, 1934 |
| 2,170,070 | Deleray | Aug. 22, 1939 |
| 2,262,285 | Ireland | Nov. 11, 1941 |
| 2,591,886 | Snyder | Apr. 8, 1952 |